(12) United States Patent
Kim et al.

(10) Patent No.: US 11,277,257 B2
(45) Date of Patent: Mar. 15, 2022

(54) METHOD AND APPARATUS FOR PERFORMING OPERATION USING ENCRYPTED DATA

(71) Applicant: SAMSUNG SDS CO., LTD., Seoul (KR)

(72) Inventors: Eun Kyung Kim, Seoul (KR); Duk Jae Moon, Seoul (KR); Hyo Jin Yoon, Seoul (KR); Jung Hoon Sohn, Seoul (KR); Jang Hyuk Ahn, Seoul (KR); Jin Hyuck Jeong, Seoul (KR); Ji Hoon Kwon, Seoul (KR); Young Hyun Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 112 days.

(21) Appl. No.: 16/884,845

(22) Filed: May 27, 2020

(65) Prior Publication Data

US 2021/0297232 A1 Sep. 23, 2021

(30) Foreign Application Priority Data

Mar. 23, 2020 (KR) .......................... 10-2020-0035085
May 21, 2020 (KR) .......................... 10-2020-0060916

(51) Int. Cl.
*H04L 9/06* (2006.01)
*H04L 9/08* (2006.01)
*H04L 9/00* (2022.01)

(52) U.S. Cl.
CPC ............ *H04L 9/008* (2013.01); *H04L 9/0618* (2013.01); *H04L 9/0891* (2013.01)

(58) Field of Classification Search
CPC ..... H04L 9/008; H04L 9/0618; H04L 9/0891; H04L 9/0897; H04L 2209/76
See application file for complete search history.

(56) References Cited

U.S. PATENT DOCUMENTS

| | | | |
|---|---|---|---|
| 2013/0170640 A1* | 7/2013 | Gentry | H04L 9/3093 380/30 |
| 2018/0019983 A1* | 1/2018 | Tissot | G06F 21/62 |
| 2021/0083841 A1* | 3/2021 | Tueno | H04L 9/008 |

FOREIGN PATENT DOCUMENTS

KR 10-2040120 B1 11/2019

OTHER PUBLICATIONS

Secure SURF with Fully Homomorphic Encryption, Shorten et al. (Year: 2017).*

(Continued)

*Primary Examiner* — Vu V Tran
(74) *Attorney, Agent, or Firm* — The PL Law Group, PLLC

(57) ABSTRACT

A method for performing an operation according to one embodiment includes performing a homomorphic operation using one or more ciphertexts that are homomorphically encrypted based on an encryption key, determining a count value for a ciphertext generated through the homomorphic operation based on count values for each of the one or more ciphertexts, requesting a key management apparatus, which holds the encryption key and a decryption key corresponding to the encryption key, to re-encrypt the generated ciphertext based on the determined count value, acquiring, from the key management apparatus, a ciphertext generated by re-encrypting the generated ciphertext through decryption based on the decryption key and encryption based on the encryption key; and determining a count value for the acquired ciphertext to be a preset initial value.

20 Claims, 3 Drawing Sheets

(56) References Cited

OTHER PUBLICATIONS

European Search Report For EP 20202277.8 dated Mar. 26, 2021 from European patent office in a counterpart European patent application.
Sujoy Sinha Roy et al., "Hardware Assisted Fully Homomorphic Function Evaluation and Encrypted Search", IEEE Transactinon Coumputers, vol. 66 (9), 2017.
Zhang Yonghong et al., "Privacy-Preserving Outsourcing Computation of QR Decomposition in the Encrypted Domain", 2019 18th IEEE International Conference on Trust. Security and Privacy in Computing and Communications/13th IEEE International Conference on Big Data Science and Engineering (TRUSTCOM/BIGDATASE). IEEE. 2019, pp. 389-396. XP033653693. DOI: 10.1109/TRUSTCOM/BIGDATASE.2019.00059.
Brack Samuel et al., "Recommender Systems on Homomorphically Encrypted Databases for Enhanced User Privacy", 2019 IEEE 44th LCN Symposium on Emerging Topics in Networking (LCN Symposium). IEEE. 2019, pp. 74-82, XP033720387. DOI:10.1109/LCNSYMPOSIUM47956.2019.9000668.
Paindavoine Marie et al., "Minimizing the Number of Bootstrappings in Fully Homomorphic Encryption", 2016, Big Data Analytics in the Social and Ubiquitous Context : 5th International Workshop on Modeling Social Media. MSM 2014. 5th International Workshop on Mining Ubiquitous and Social Environments. Muse 2014 and First International Workshop on Machine LE.

\* cited by examiner

METHOD AND APPARATUS FOR PERFORMING OPERATION USING ENCRYPTED DATA

CROSS REFERENCE TO RELATED APPLICATIONS AND CLAIM OF PRIORITY

This application claims the benefit of Korean Patent Application Nos. 10-2020-0035085 filed on Mar. 23, 2020 and 10-2020-0060916 filed on May 21, 2020 in the Korean Intellectual Property Office, the disclosure of which is incorporated herein by reference in its entirety.

TECHNICAL FIELD

The disclosed embodiments relate to encryption technology.

BACKGROUND ART OF THE INVENTION

Homomorphic encryption allows various analysis algorithms to be calculated in an encrypted state by using homomorphic addition and homomorphic multiplication for calculating ciphertext of addition and multiplication. In general, ciphertexts of homomorphic encryption are configured in such a form that an appropriate random value is added to a message and the random value is configured such that it can be efficiently removed using a decryption key. In this case, the random value is represented as addition of two types of values, and when the decryption key is denoted by s, the random value is in the form of a·s+e. Generally, as the homomorphic operation (e.g., homomorphic addition, homomorphic multiplication, etc.) proceeds, a random value a·s remains in the same form and can be efficiently removed during decryption. As the homomorphic operation proceeds, a random value e becomes impossible to remove after a certain point and damages the message. An operation that solves such problems is a bootstrapping operation.

The bootstrapping operation is a method of performing a decryption algorithm in an encrypted state using an encrypted decryption key, the operation time is determined according to the complexity of the algorithm. However, a decryption algorithm of the conventional homomorphic encryption is not only composed of non-polynomials, but also requires a bootstrapping operation to be performed each time an operation cannot be performed on a ciphertext, which causes a significant increase in the execution time of an analysis algorithm using the homomorphic encryption.

SUMMARY

The disclosed embodiments are to provide a method and apparatus for performing an operation using encrypted data.

A method for performing an operation according to one embodiment includes performing a homomorphic operation using one or more ciphertexts that are homomorphically encrypted based on an encryption key; determining a count value for a ciphertext generated through the homomorphic operation based on count values for each of the one or more ciphertexts; requesting a key management apparatus, which holds the encryption key and a decryption key corresponding to the encryption key, to re-encrypt the generated ciphertext based on the determined count value; acquiring, from the key management apparatus, a ciphertext generated by re-encrypting the generated ciphertext through decryption based on the decryption key and encryption based on the encryption key; and determining a count value for the acquired ciphertext to be a preset initial value.

The homomorphic operation may include one of homomorphic multiplication and homomorphic addition.

The determining may include determining that a value greater than or equal to the count value for one of the one or more ciphertexts is the count value for the generated ciphertext.

The requesting may include requesting the key management apparatus to re-encrypt the generated ciphertext when the determined count value is greater than or equal to a preset maximum value.

When the generated ciphertext is a ciphertext generated through the homomorphic operation of two ciphertext each of which is homomorphically encrypted based on the encryption key and count values for each of the two ciphertexts are different, the determining may include determining that a value greater than or equal to a larger value between the count values for each of the two ciphertexts is the count value for the generated ciphertext.

The determining may include determining that a value less than or equal to the count value for one of the one or more ciphertexts is the count value for the generated ciphertext.

The requesting may include requesting the key management apparatus to re-encrypt the generated ciphertext when the determined count value is less than or equal to a preset minimum value.

When the generated ciphertext is generated through the homomorphic operation of two ciphertexts each of which is homomorphically encrypted based on the encryption key and count values for each of the two ciphertexts are different, the determining may include determining that a value less than or equal to a smaller value between the count values for each of the two ciphertexts is the count value for the generated ciphertext.

The acquired ciphertext may be a ciphertext that the key management apparatus generates by decrypting the generated ciphertext using the decryption key and then encrypting, using the encryption key, data resulting from the decryption.

The acquired ciphertext may be a ciphertext that the key management apparatus generates by decrypting the generated ciphertext using the decryption key, performing a rounding operation on data resulting from the decryption, and encrypting, using the encryption key, the data on which the rounding operation is performed.

An apparatus for performing an operation according to one embodiment includes a calculation unit configured to perform a homomorphic operation using one or more ciphertexts that are homomorphically encrypted based on an encryption key and to determine a count value for a ciphertext generated through the homomorphic operation based on count values for each of the one or more ciphertexts; and a re-encryption requester configured to request a key management apparatus, which holds the encryption key and a decryption key corresponding to the encryption key, to re-encrypt the generated ciphertext based on the determined count value and to acquire, from the key management apparatus, a ciphertext generated by re-encrypting the generated ciphertext through decryption based on the decryption key and encryption based on the encryption key, wherein the calculation unit is configured to determine a count value for the acquired ciphertext to be a preset initial value.

The homomorphic operation may include one of homomorphic multiplication and homomorphic addition.

The calculation unit may determine that a value greater than or equal to the count value for one of the one or more ciphertexts is the count value for the generated ciphertext.

The re-encryption requester may request the key management apparatus to re-encrypt the generated ciphertext when the determined count value is greater than or equal to a preset maximum value.

When the generated ciphertext is a ciphertext generated through the homomorphic operation of two ciphertext each of which is homomorphically encrypted based on the encryption key and count values for each of the two ciphertexts are different, the calculation unit may determine that a value greater than or equal to a larger value between the count values for each of the two ciphertexts is the count value for the generated ciphertext.

The calculation unit may determine that a value less than or equal to the count value for one of the one or more ciphertexts is the count value for the generated ciphertext.

The re-encryption requester may request the key management apparatus to re-encrypt the generated ciphertext when the determined count value is less than or equal to a preset minimum value.

When the generated ciphertext is generated through the homomorphic operation of two ciphertexts each of which is homomorphically encrypted based on the encryption key and count values for each of the two ciphertexts are different, the calculation unit may determine that a value less than or equal to a smaller value between the count values for each of the two ciphertexts is the count value for the generated ciphertext.

The acquired ciphertext may be a ciphertext that the key management apparatus generates by decrypting the generated ciphertext using the decryption key and then encrypting, using the encryption key, data resulting from the decryption.

The acquired ciphertext may be a ciphertext that the key management apparatus generates by decrypting the generated ciphertext using the decryption key, performing a rounding operation on data resulting from the decryption, and encrypting, using the encryption key, the data on which the rounding operation is performed.

According to the disclosed embodiments, by performing re-encryption using a key management apparatus having encryption and decryption keys, instead of a bootstrapping operation that requires excessive operation execution time, it is possible to obtain the same effects as the bootstrapping operation within a relatively short period of time as compared to the case where the bootstrapping operation is performed.

DETAILED DESCRIPTION OF THE INVENTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made based on the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
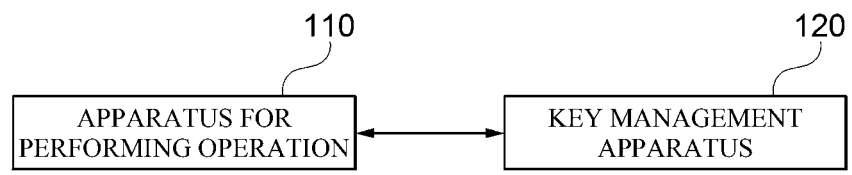
FIG. 1 is a diagram illustrating a configuration of a computing system based on homomorphic encryption according to one embodiment.

FIG. 1 is a diagram illustrating a configuration of a computing system based on homomorphic encryption according to one embodiment.

Referring to FIG. 1, the computing system 100 according to one embodiment includes an apparatus 110 for performing an operation and a key management apparatus 120.

The apparatus 110 for performing an operation is an apparatus for performing a homomorphic operation using data encrypted using a homomorphic encryption algorithm.

In this case, the homomorphic encryption algorithm refers to an encryption technique capable of calculating encrypted data in an encrypted state. In one embodiment, it is sufficient that the homomorphic encryption algorithm supports a homomorphic operation for a specific operation, and the homomorphic encryption algorithm is not necessarily limited to a specific type of homomorphic encryption algorithm.

Meanwhile, when the homomorphic encryption algorithm supports a homomorphic operation for a specific operation, it may mean that a ciphertext for a result of applying a specific operation on a plaintext of a ciphertext can be generated by performing an operation on the corresponding ciphertext, which is encrypted using the same encryption key, in an encrypted state.

More specifically, a homomorphic operation $\boxplus$ for addition (hereinafter, referred to as "homomorphic addition") refers to an operation which generates, for example, as shown in Equation 1 below, a ciphertext $Enc(pk, x_1+x_2)$ that encrypts an addition result of plaintext data $x_1$ and plaintext data $x_2$ using a ciphertext $Enc(pk, x_1)$ and a ciphertext $Enc(pk, x_2)$ in an encrypted state, wherein the ciphertext $Enc(pk, x_1)$ is obtained by encrypting the plaintext data $x_1$ using an encryption key pk and the ciphertext $Enc(pk, x_2)$ is obtained by encrypting the plaintext data $x_2$ using the encryption key pk.

$$Enc(pk, x_1) \boxplus Enc(pk, x_2) \rightarrow Enc(pk, x_1+x_2) \qquad \text{[Equation 1]}$$

In another example, a homomorphic operation $\boxdot$ for multiplication (hereinafter, referred to as "homomorphic multiplication") refers to an operation which generates, for example, as shown in Equation 2 below, a ciphertext $Enc(pk, x_1 \cdot x_2)$ that encrypts a multiplication result of plaintext data $x_1$ and plaintext data $x_2$ using a ciphertext $Enc(pk, x_1)$ and a ciphertext $Enc(pk, x_2)$ in an encrypted state, wherein the ciphertext $Enc(pk, x_1)$ is obtained by encrypting the plaintext data $x_1$ using an encryption key pk and the ciphertext $Enc(pk,x_2)$ is obtained by encrypting the plaintext data $x_2$ using the encryption key pk.

$$Enc(pk,x_1) \boxdot Enc(pk,x_2) \rightarrow Enc(pk,x_1 \cdot x_2) \quad [\text{Equation 2}]$$

Meanwhile, the key management apparatus 120 is an apparatus that holds a decryption key used for decryption of a ciphertext generated by a homomorphic operation in the apparatus 110 for performing an operation and an encryption key corresponding to the decryption key.

According to one embodiment, when the apparatus 100 for performing an operation requests re-encryption of a ciphertext, the key management apparatus 120 may perform requested re-encryption of the ciphertext through decryption based on the decryption key and encryption based on the encryption key, and provide the re-encrypted ciphertext to the apparatus 110 for performing an operation.

Figure 2:
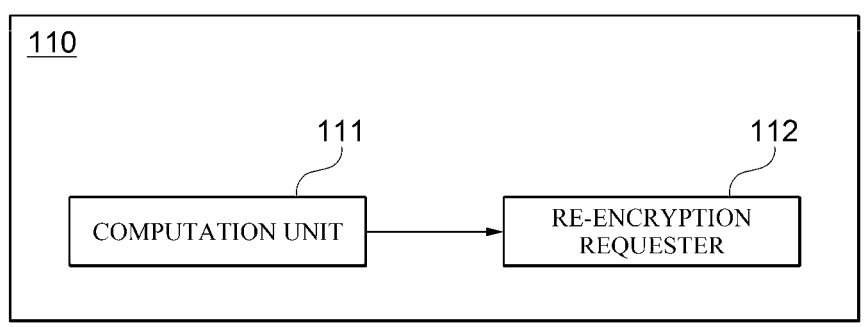
FIG. 2 is a block diagram illustrating an apparatus for performing an operation according to one embodiment.

FIG. 2 is a block diagram illustrating an apparatus for performing an operation according to one embodiment.

Referring to FIG. 2, the apparatus 110 for performing an operation according to one embodiment includes a computation unit 111 and a re-encryption requester 112.

In the embodiment shown in FIG. 2, the computation unit 111 and the re-encryption requester 112 are each implemented by using one or more physically separated devices, or may be implemented by combining one or more processors, or combining one or more processors and software, and, unlike the illustrated example, specific operations thereof may not be clearly distinguished.

The calculation unit 111 performs a homomorphic operation using one or more ciphertexts that are homomorphically encrypted based on an encryption key.

In this case, the homomorphically encrypted ciphertext collectively refers to a ciphertext generated through encryption using a homomorphic encryption algorithm and a ciphertext generated through a homomorphic operation using one or more other ciphertexts, and, hereinafter, a "ciphertext" refers to a homomorphically encrypted ciphertext.

Meanwhile, the homomorphic operation may be, for example, one of homomorphic multiplication and homomorphic addition, but is not necessarily limited to a specific type of homomorphic operation.

When a ciphertext is generated through a homomorphic operation, the calculation unit 111 determines a count value for the generated ciphertext based on a count value for each ciphertext used for homomorphic operation.

In this case, a count value for a ciphertext means a value used as a measure for determining whether a homomorphic operation can be performed using the corresponding ciphertext.

Specifically, the count value for a ciphertext generated through encryption using a homomorphic encryption algorithm may be determined to be a preset initial value, and a count value for a ciphertext generated through homomorphic encryption may be determined to be a value greater than or equal to a preset initial value or a value less than or equal to the preset initial value according to an embodiment.

According to a first embodiment, the count value for the ciphertext generated through the homomorphic operation may be determined as a value greater than or equal to the count value for one of the one or more ciphertexts used for the homomorphic operation.

Specifically, when the ciphertext generated through the homomorphic operation is generated through the homomorphic operation using one ciphertext, the calculation unit 111 may determine a value greater than or equal to the count value for the ciphertext used for the homomorphic operation as the count value for the generated ciphertext.

In addition, when the ciphertext generated through the homomorphic operation is generated through the homomorphic operation using two ciphertexts having the same count value, the calculation unit 111 may determine a value greater than or equal to the count values for each of the two ciphertexts as the count value for the generated ciphertext.

Additionally, when the ciphertext generated through the homomorphic operation is generated through the homomorphic operation using two ciphertexts having different count values, the calculation unit 111 may determine a value greater than or equal to a larger value between the count values for each of the two ciphertexts as the count value for the generated ciphertext.

For example, a count value for a ciphertext generated through a homomorphic operation using a ciphertext $C_1$ having a count value of $l_1$ may be determined to be $l_1+\alpha$.

In another example, a count value for a ciphertext generated through a homomorphic operation using two ciphertexts $C_1$ and $C_2$ each having a count value of $l_1$ may be determined to be $l_1+\alpha$.

In still another example, a count value for a ciphertext generated through a homomorphic operation using a ciphertext $C_1$ having a count value of $l_1$ and a ciphertext $C_3$ having a count value of $l_2$ (where $l_1<l_2$) may be determined to be $l_2+\alpha$.

Meanwhile, in the examples described above, a is a count value increment amount corresponding to the type of the homomorphic operation, and may be a preset value. For example, when the homomorphic operation used for generating a ciphertext is homomorphic multiplication, a may be set to 1. Also, when the homomorphic operation used for generating a ciphertext is homomorphic addition, a may be set to 0. However, the count value increment amount $\alpha$ is not necessarily limited to the above-described examples, and may be set differently according to an embodiment.

Meanwhile, according to a second embodiment, the count value for the ciphertext generated through the homomorphic operation may be determined to be a value equal to or less than the count value for one of the one or more ciphertexts used for the homomorphic operation.

Specifically, when the ciphertext generated through the homomorphic operation is generated through the homomorphic operation using one ciphertext, the calculation unit 111 may determine a value less than or equal to the count value for the ciphertext used for the homomorphic operation as the count value for the generated ciphertext.

In addition, when the ciphertext generated through the homomorphic operation is generated through the homomorphic operation using two ciphertexts having the same count value, the calculation unit 111 may determine a value less than or equal to count values for each of the two ciphertexts as the count value for the generated ciphertext.

In addition, when the ciphertext generated through the homomorphic operation is generated through the homomorphic operation using two ciphertexts having different count values, the calculation unit 111 may determine a value less than or equal to a smaller value between count values for each of the two ciphertexts as the count value for the generated ciphertext.

For example, a count value for a ciphertext generated through a homomorphic operation using a ciphertext $C_1$ having a count value of $l_1$ may be determined to be $l_1-\beta$.

In another example, a count value for a ciphertext generated through a homomorphic operation using ciphertexts $C_1$ and $C_2$ each having a count value of $l_1$ may be determined to be $l_1-\beta$.

In still another example, a count value for a ciphertext generated through a homomorphic operation using a ciphertext $C_1$ having a count value of $l_1$ and a ciphertext $C_3$ having a count value of l2 (where $l_1 < l_2$) may be determined to be $l_1-\beta$.

In the examples described above, $\beta$ is a count value decrement amount corresponding to the type of the homomorphic operation, and may be a preset value. For example, when the homomorphic operation used for generating a ciphertext is homomorphic multiplication, $\beta$ may be set to 1. Also, when the homomorphic operation used for generating a ciphertext is homomorphic addition, $\beta$ may be set to 0. However, the count value decrement amount $\beta$ is not necessarily limited to the above-described examples, and may be set differently according to an embodiment.

Meanwhile, when the ciphertext is generated through the homomorphic operation, the re-encryption requester 112 requests the key management apparatus 120 to re-encrypt the generated ciphertext based on the count value determined for the generated ciphertext.

Specifically, when the count value for the ciphertext generated through the homomorphic operation is determined to be a value greater than or equal to a count value for one of the one or more ciphertexts used for the homomorphic operation as in the first embodiment described above, the re-encryption requester 112 may determine whether or not the count value determined for the ciphertext generated through the homomorphic operation is greater than or equal to a preset maximum value. In this case, when the determined count value is greater than or equal to the preset maximum value, the re-encryption requester 112 may request the key management apparatus 120 to re-encrypt the generated ciphertext.

On the other hand, when the count value for the ciphertext generated through the homomorphic operation is determined to be a value less than or equal to a count value for one of the one or more ciphertexts used for the homomorphic operation as in the second embodiment described above, the re-encryption requester 112 may determine whether or not the count value determined for the ciphertext generated through the homomorphic operation is less than or equal to a preset minimum value. In this case, when the determined count value is less than or equal to the preset minimum value, the re-encryption requester 112 may request the key management apparatus 120 to re-encrypt the generated ciphertext.

Meanwhile, in the above-described embodiment, the preset minimum value and the preset maximum value may be set differently according to an embodiment.

Meanwhile, the re-encryption requester 112 acquires, from the key management apparatus 120, a ciphertext obtained by re-encrypting, using a homomorphic encryption algorithm, the ciphertext requested to be re-encrypted.

In this case, the ciphertext obtained from the key management apparatus 120 may be a ciphertext that the key management apparatus 120 generates by re-encrypting the requested ciphertext through decryption based on the decryption key and encryption based on the encryption key.

Specifically, according to one embodiment, the ciphertext acquired from the key management apparatus 120 in response to the re-encryption request may be a ciphertext that the key management apparatus 120 generates by decrypting, using the decryption key, the ciphertext requested to be re-encrypted and then encrypting, using the encryption key, data resulting from the decryption.

In this case, according to one embodiment, the key management apparatus 120 may perform a rounding operation on the data resulting from the decryption and then encrypt, using the encryption key, the data on which the rounding operation is performed. For example, when the homomorphic encryption algorithm is a homomorphic encryption algorithm that supports an approximation operation, there is a difference between a result of decrypting the ciphertext generated through the homomorphic operation and a computation result for plaintext data corresponding to the homomorphic operation, and such a difference may be removed through the rounding operation on the data resulting from the decryption.

On the other hand, when the re-encryption requester 112 acquires the re-encrypted ciphertext from the key management apparatus 120, the calculation unit 111 determines the count value for the acquired ciphertext to be a preset initial value.

Specifically, when the count value for the ciphertext generated through the homomorphic operation is determined to be greater than or equal to the count value for one of the one or more ciphertexts used for the homomorphic operation as in the above-described first embodiment, the preset initial value may be, for example, 0.

In addition, when the count value for the ciphertext generated through the homomorphic operation is determined to be less than or equal to the count value for one of the one or more ciphertexts used for the homomorphic operation as in the above-described second embodiment, the preset initial value may be, for example, a value greater than 1.

However, the preset initial value is not necessarily limited to the above-described examples, and may be set differently according to an embodiment.

Figure 3:
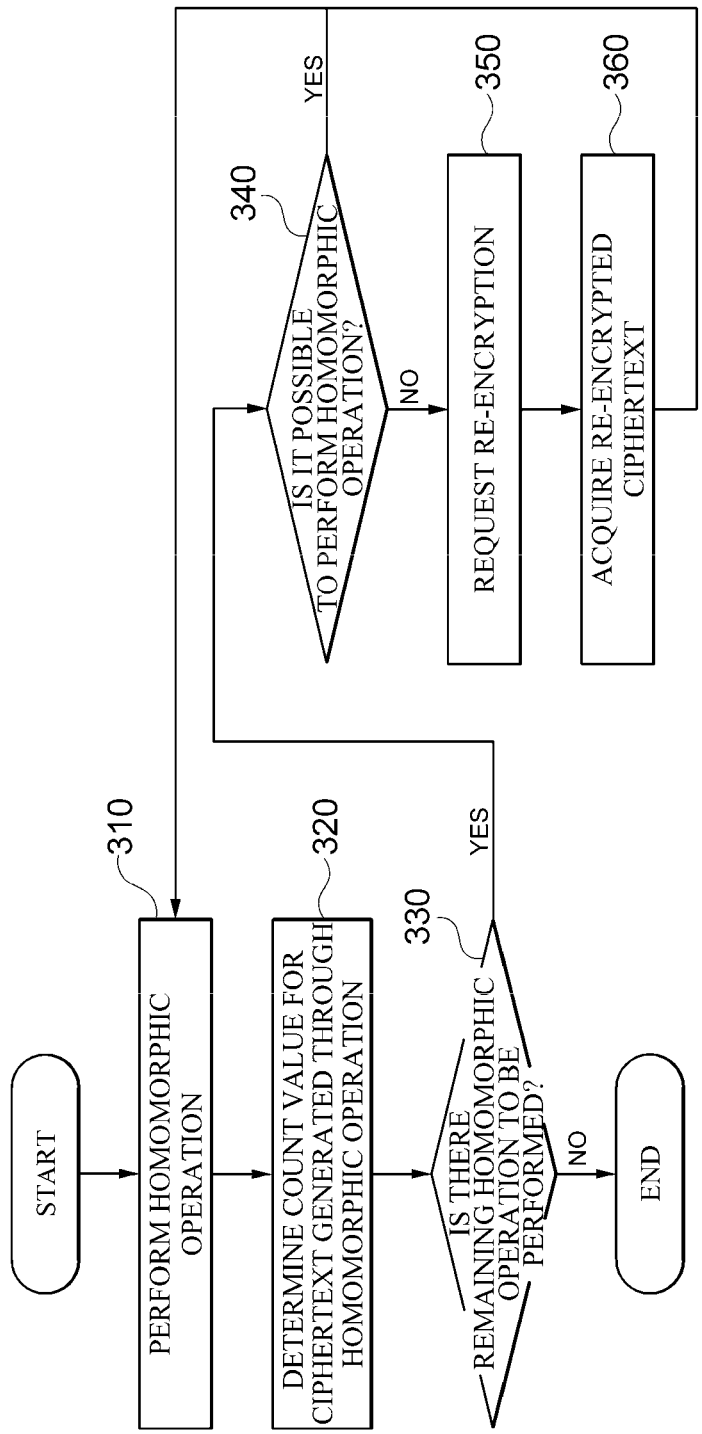
FIG. 3 is a flowchart illustrating a method of performing an operation according to one embodiment.

FIG. 3 is a flowchart illustrating a method of performing an operation according to one embodiment.

The method illustrated in FIG. 3 may be performed by, for example, the apparatus 110 for performing an operation illustrated in FIGS. 1 and 2.

Referring to FIG. 3, the apparatus 110 for performing an operation first performs a homomorphic operation using one or more ciphertexts that are homomorphically encrypted based on an encryption key (310).

Thereafter, the apparatus 110 for performing an operation determines a count value for the ciphertext generated through the homomorphic operation (320).

At this time, the count value may be determined according to the first or second embodiment described above.

Then, the apparatus 110 for performing an operation determines whether there is a remaining homomorphic operation to perform using the ciphertext generated through the homomorphic operation (330).

In this case, when there is a remaining homomorphic operation to perform, the apparatus 110 for performing an operation determines whether it is possible to perform the remaining homomorphic operation based on the determined count value (340).

In this case, when it is possible to perform the remaining homomorphic operation, the apparatus 110 for performing an operation performs the subsequent operations of operation 310 again using the ciphertext generated through the homomorphic operation.

On the contrary, when it is not possible to perform the remaining homomorphic operation, the apparatus 110 for performing an operation requests the key management apparatus 120 to re-encrypt the ciphertext generated through the homomorphic operation (350), and acquires a re-encrypted ciphertext from the key management apparatus 120 (360).

Thereafter, the apparatus 110 for performing an operation performs the subsequent operations of operation 310 again using the ciphertext acquired from the key management apparatus 120.

Meanwhile, in the flowchart illustrated in FIG. 3, at least some of the operations may be performed in different order or may be combined into fewer operations or further divided into more operations. In addition, some of the operations may be omitted, or one or more extra operations, which are not illustrated, may be added to the flowchart and be performed.

Figure 4:
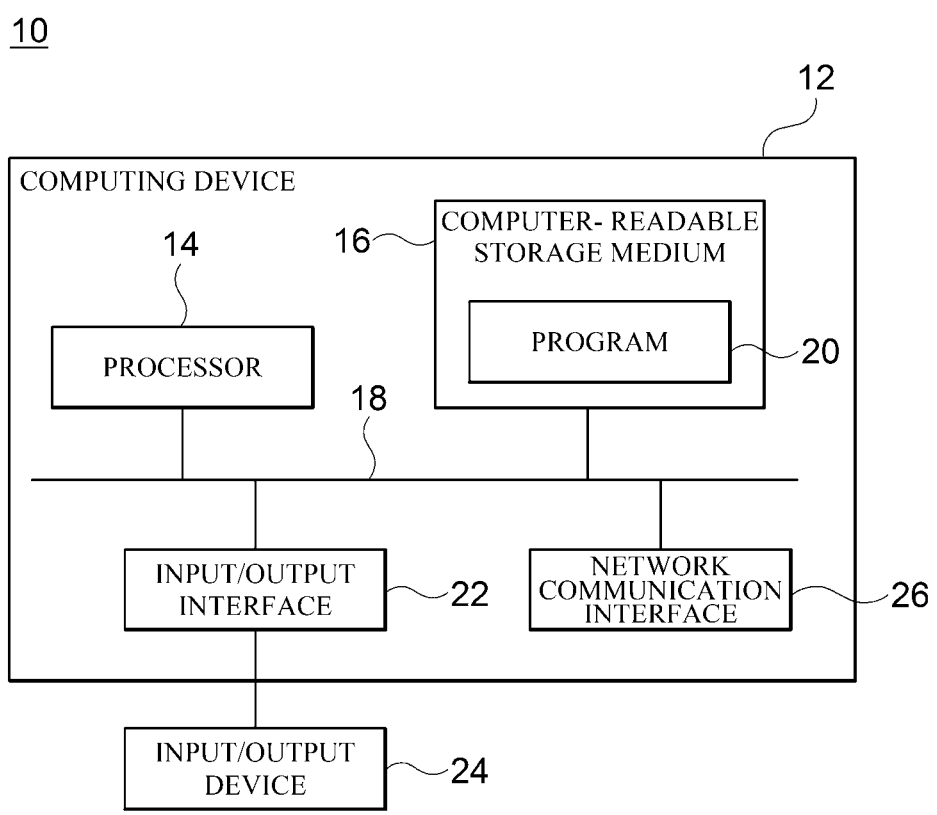
FIG. 4 is a block diagram for describing an example of a computing environment including a computing device according to one embodiment.

FIG. 4 is a block diagram for describing an example of a computing environment including a computing device according to one embodiment. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the apparatus 110 for performing an operation illustrated in FIG. 2.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

While representative embodiments of the preset invention have been described above in detail, it may be understood by those skilled in the art that the embodiments may be variously modified without departing from the scope of the present invention. Therefore, the scope of the present invention is defined not by the described embodiment but by the appended claims, and encompasses equivalents that fall within the scope of the appended claims.

The invention claimed is:

1. A method for performing an operation, comprising:
performing a homomorphic operation using one or more ciphertexts that are homomorphically encrypted based on an encryption key;
determining a count value for a ciphertext generated through the homomorphic operation based on count values for each of the one or more ciphertexts, wherein the count value is used to measure for determining whether the homomorphic operation can be performed using a corresponding ciphertext;
requesting a key management apparatus, which holds the encryption key and a decryption key corresponding to the encryption key, to re-encrypt the generated ciphertext based on the determined count value;
acquiring, from the key management apparatus, a ciphertext generated by re-encrypting the generated ciphertext through decryption based on the decryption key and encryption based on the encryption key; and
determining a count value for the acquired ciphertext to be a preset initial value.

2. The method of claim 1, wherein the homomorphic operation includes one of homomorphic multiplication and homomorphic addition.

3. The method of claim 1, wherein the determining comprises determining the count value for the generated ciphertext as being greater than or equal to the count value for one of the one or more ciphertexts.

4. The method of claim 3, wherein the requesting comprises requesting the key management apparatus to re-encrypt the generated ciphertext when the determined count value is greater than or equal to a preset maximum value.

5. The method of claim 3, wherein, when the generated ciphertext is a ciphertext generated through the homomorphic operation of two ciphertext each of which is homomorphically encrypted based on the encryption key and count values for each of the two ciphertexts are different, the determining comprises determining the count value for the generated ciphertext as being greater than or equal to a larger value between the count values for each of the two ciphertexts.

6. The method of claim 1, wherein the determining comprises determining the count value for the generated ciphertext as being less than or equal to the count value for one of the one or more ciphertexts.

7. The method of claim 6, wherein the requesting comprises requesting the key management apparatus to re-encrypt the generated ciphertext when the determined count value is less than or equal to a preset minimum value.

8. The method of claim 6, wherein, when the generated ciphertext is generated through the homomorphic operation of two ciphertexts each of which is homomorphically encrypted based on the encryption key and count values for each of the two ciphertexts are different, the determining comprises determining the count value for the generated ciphertext as being less than or equal to a smaller value between the count values for each of the two ciphertexts.

9. The method of claim 1, wherein the acquired ciphertext is a ciphertext that the key management apparatus generates by decrypting the generated ciphertext using the decryption key and then encrypting, using the encryption key, data resulting from the decryption.

10. The method of claim 1, wherein the acquired ciphertext is a ciphertext that the key management apparatus generates by decrypting the generated ciphertext using the decryption key, performing a rounding operation on data resulting from the decryption, and encrypting, using the encryption key, the data on which the rounding operation is performed.

11. An apparatus for performing an operation, comprising:
a calculation unit configured to perform a homomorphic operation using one or more ciphertexts that are homomorphically encrypted based on an encryption key and to determine a count value for a ciphertext generated through the homomorphic operation based on count values for each of the one or more ciphertexts, wherein the count value is used to measure for determining whether the homomorphic operation can be performed using a corresponding ciphertext; and
a re-encryption requester configured to request a key management apparatus, which holds the encryption key and a decryption key corresponding to the encryption key, to re-encrypt the generated ciphertext based on the determined count value and to acquire, from the key management apparatus, a ciphertext generated by re-encrypting the generated ciphertext through decryption based on the decryption key and encryption based on the encryption key,
wherein the calculation unit is configured to determine a count value for the acquired ciphertext to be a preset initial value.

12. The apparatus of claim 11, wherein the homomorphic operation includes one of homomorphic multiplication and homomorphic addition.

13. The apparatus of claim 11, wherein the calculation unit is further configured to determine the count value for the generated ciphertext as being greater than or equal to the count value for one of the one or more ciphertexts.

14. The apparatus of claim 13, wherein the re-encryption requester is further configured to request the key management apparatus to re-encrypt the generated ciphertext when the determined count value is greater than or equal to a preset maximum value.

15. The apparatus of claim 13, wherein, when the generated ciphertext is a ciphertext generated through the homomorphic operation of two ciphertext each of which is homomorphically encrypted based on the encryption key and count values for each of the two ciphertexts are different, the calculation unit is further configured to determine the count value for the generated ciphertext as being greater than or equal to a larger value between the count values for each of the two ciphertexts.

16. The apparatus of claim 11, wherein the calculation unit is further configured to determine the count value for the generated ciphertext as being less than or equal to the count value for one of the one or more ciphertexts.

17. The apparatus of claim 16, wherein the re-encryption requester is configured to request the key management apparatus to re-encrypt the generated ciphertext when the determined count value is less than or equal to a preset minimum value.

18. The apparatus of claim 16, wherein, when the generated ciphertext is generated through the homomorphic operation of two ciphertexts each of which is homomorphically encrypted based on the encryption key and count values for each of the two ciphertexts are different, the calculation unit is further configured to determine the count value for the generated ciphertext as being less than or equal to a smaller value between the count values for each of the two ciphertexts.

19. The apparatus of claim 11, wherein the acquired ciphertext is a ciphertext that the key management apparatus generates by decrypting the generated ciphertext using the decryption key and then encrypting, using the encryption key, data resulting from the decryption.

20. The apparatus of claim 11, wherein the acquired ciphertext is a ciphertext that the key management apparatus generates by decrypting the generated ciphertext using the decryption key, performing a rounding operation on data resulting from the decryption, and encrypting, using the encryption key, the data on which the rounding operation is performed.

* * * * *